United States Patent [19]

Zuberer

[11] Patent Number: 5,449,401
[45] Date of Patent: Sep. 12, 1995

[54] ASPHALT PAVING USING FLY-ASH

[76] Inventor: Herman L. Zuberer, 7406 Lesane Dr., Louisville, Ky. 40214

[21] Appl. No.: 301,551

[22] Filed: Sep. 6, 1994

[51] Int. Cl.$^6$ ............................................. C09D 195/00
[52] U.S. Cl. ........................... 106/284.02; 106/284.01; 106/DIG. 1
[58] Field of Search ..................... 106/284.01, 284.02, 106/DIG. 1

[56] References Cited

U.S. PATENT DOCUMENTS 3,206,319  9/1965  Minnick et al. ................. 106/284.01
3,802,898  4/1974  Laurent et al. ................... 106/280
4,560,414  12/1985  Kikegawa et al. ............... 106/273.1

FOREIGN PATENT DOCUMENTS 57-133151  8/1982  Japan ............................. 106/284.02

Primary Examiner—David Brunsman

[57] ABSTRACT

The addition of about 35 volume % fly ash to the aggregate component of of hot-mix asphalt enhances the resistance of the asphalt to cracks and potholes. This new type of hot-mix asphalt should last at least five times longer than the normal hot-mix asphalt.

2 Claims, No Drawings

ASPHALT PAVING USING FLY-ASH

The inventor first became interested in developing a process for ASPHALT back in April 1988. As a trustee at the Epworth United Methodist Church in Louisville, Ky., they were involved in getting their parking lot paved. No contractor would guarantee their work not to crack or have pot holes.

The inventor started looking for many answers. By watching the contractors in his own subdivision, he noticed that by measuring the cracks in newly laid asphalt from July 1988 to January 1989 the cracks in the asphalt had grown from ⅛ inch to ½ inch. What was causing this phenomenon?

Was it a combination of the hot-asphalt mix or the limestone being used? By performing many experiments it became obvious that the biggest factor was the expansion and contraction of the limestone. With the extreme temperature changes from summer to winter with rains, snow etc, he determined that the temperature and amount of moisture would determine just how quickly the cracks in the asphalt would become pot-holes.

Before retiring from Rohm & Haas Chemical he worked with FLY-ASH extensively.

Fly-Ash is much harder that crushed limestone and is a waste product from coal generation power and steam plants. Most plants in the Midwest and Northeast still use coal and it is estimated that there is enough fly-ash buried in and around these plants to handle every hot-mix asphalt plant in North America for more than five years. (Refer to Table 1). It was recently reported on Paul Harvey's new's broadcast that cement manufacturers have started to use fly ash and reported that there is currently over 48 million tons buried today as a waste by-product.

Hot-mix Asphalt plants have been surveyed in Kentucky, Indiana, South Carolina, and Texas to verify uniformity in the manufacturing process. All use pretty much that same process with respect to 40 to 50 foot towers for bringing the limestone or crushed rocks (sizes do vary depending on type of job) and spraying of asphalt before dumping in the trucks for delivery.

Experimentation started by making small batches using limestone and fly-ash mixed in a cast-iron skillet heated with a propane torch to 300 F. and adding asphalt to make his own hot-mix. After more than two years of experiments, he has found that by controlling the volume of fly-ash to 35% mix with limestone and adding the asphalt, he got a product that is completely impervious to cracks and pot-holes.

Several test patterns " thick by 6" diameter were made and measured with micrometers at 90 F. then frozen at −10 F. for twenty-four hours and measured again. Experiment after experiment yielded the same measurement. Only 0.001difference.

These experiments not only proved that by adding the right amount of fly-ash controlled expansion and contraction, but it also made the product 99% waterproof. Samples of these products have been made as well as used in a pot-hole on his street and have been there for over four years and are like brand new.

Much has been studied and written about all the problems associated with asphalt. Many companies have added different polymers, some are trying latex solutions, et., but none have though of using a natural by-product "FLY-ASH".

The physical phenomena causing segregation can be attributed to the potential energy difference between stones and is related to their individual mass or weight. For instance, if a large stone and a small stone are placed side-by-side on an inclined plane (slope) the larger stone, because of its greater weight and potential energy, will roll further down the slope and require more time to expend its energy than the smaller, lighter stone, thus causing separation between the two stones. In a pile of aggregate of HMA, a natural angle of repose is established by the mix itself.

Many changes in the manufacturing process has been tried, for example, reducing the segregation potential is to minimize the length of the slope over which the two stones can pass and therefore reduce the time and distance available for them to separate. However, should fly-ash be added to this process and allowed to build its mass along with the stones while being coated with the hot asphalt, the hot-mix would then become impervious to cracks thereby eliminating pot-holes.

Based on these experiments, this new type of hot-mix asphalt should last at least five times longer the normal hot-mix asphalt.

Table 1

Inorganic content of Fly-Ash used by H. L. Zuberer in development on non-cracking paving mix Experiment completed by Ed Jacklitsch BSCE/MSCE, DOW Chemical Co.

| Element | Concentration ug/g |
|---|---|
| Ca—Calcium | 378 |
| Mg—Magnesium | 2478 |
| As—Arsenic | 1015 |
| B—Boron | 20 |
| Cd—Cadmium | 18 |
| Cr—Chromium | 434 |
| Co—Cobalt | 408 |
| Cu—Copper | 320 |
| Fe—Iron | 129330 |
| Pb—Lead | 438 |
| Mn—Manganese | 121 |
| Mo—Molybdenum | 1288 |
| Ni—Nickel | 165 |
| V—Vanadium | 376 |
| Zn—Zinc | 179 |
| Se—Selenium | 378 |
| Sr—Strontium | 728 |
| Al—Aluminum | 109450 |
| Zr—Zirconium | 187 |

I claim:

1. A method of enhancing resistance to cracks and potholes in hot-mix asphalt comprising adding about 35 volume % fly ash to the aggregate which is added to the hot asphalt.

2. The method of claim 1 wherein the aggregate is crushed limestone.

* * * * *